United States Patent
Kalina

[11] Patent Number: 5,450,821
[45] Date of Patent: Sep. 19, 1995

[54] MULTI-STAGE COMBUSTION SYSTEM FOR EXTERNALLY FIRED POWER PLANTS

[75] Inventor: Alexander I. Kalina, Hillsborough, Calif.

[73] Assignee: Exergy, Inc., Hayward, Calif.

[21] Appl. No.: 127,167

[22] Filed: Sep. 27, 1993

[51] Int. Cl.$^6$ .............................. F23B 7/00
[52] U.S. Cl. ........................ 122/1 R; 431/7; 431/8; 431/170; 60/676
[58] Field of Search ............... 60/676, 698, 655, 733; 122/1 R, 1 A; 431/2, 7, 8, 170, 350, 353

[56] References Cited

U.S. PATENT DOCUMENTS

4,354,821 10/1982 Kesselring et al. ............... 431/7
4,867,674 9/1989 Keller et al. ...................... 431/10
5,085,156 2/1992 Dykema ........................... 431/10

Primary Examiner—Ira S. Lazarus
Assistant Examiner—L. Heyman
Attorney, Agent, or Firm—Fish & Richardson

[57] ABSTRACT

A multi-stage combustion apparatus and method for use with externally fired power plants that allows the temperature of the heat released at any stage to be matched to the thermal characteristics of the working fluid from the power plant.

42 Claims, 2 Drawing Sheets

MULTI-STAGE COMBUSTION SYSTEM FOR EXTERNALLY FIRED POWER PLANTS

BACKGROUND OF THE INVENTION

This invention relates to a method and systems for combusting fuel to supply heat to boilers and superheaters of externally fired power plants.

Combustion systems currently used for externally fired power plants can be divided into two categories: systems in which air fed into the combustor is preheated and systems in which air is not preheated. A combustion system with air preheating allows for higher efficiency of the power system because the heat is released in a temperature range above the temperature. at which flue gases are utilized to preheat oncoming air, e.g., usually in a temperature range above approximately 700° F.

Two known types of combustion processes include pulverized coal combustion systems (in which combusted coal is micronized into a thin powder) and fluidized bed combustion systems. Pulverized coal combustion systems are usually used only for burning coal (which, unlike other types of fuel, can be ground into thin powder). The thin coal powder is typically burned with at least 15–20% of excess air to provide complete combustion. The removal of heat is performed by special tubes surrounding the flame zone. In these tubes, the working fluid (usually water) is boiling, thus preventing the tubes from overheating and burning. The temperature of combustion typically is very high so that environmentally hazardous nitrogen oxide ($NO_x$) gases are produced as a by-product. The high combustion temperature also prevents removal of environmentally hazardous sulfur gases, e.g., through limestone addition.

In fluidized bed combustion systems, different forms of solid fuel can be combusted. The fuel is usually fed into the combustion zone mixed with limestone; the purpose of the limestone is to remove sulfur gases. As in the pulverized coal system, the fuel is typically burned with at least 15–20% of excess air to provide complete combustion. Special cooling tubes which acquire heat in such combustors are located directly in the combustion zone, thus providing effective cooling. As a result, fluidized bed combustion systems can combust fuel at temperatures of approximately 1600° F. At such temperature limestone absorbs sulfur gases and $NO_x$ gases are not produced from air. However, because the bulk of the heat is released by a single cooling of flue gas from 1600° F. to approximately 700° F., there is not enough released heat for reheating the working fluid in the power cycle, thereby decreasing the efficiency of the power system.

SUMMARY OF THE INVENTION

In a first aspect, the invention features a method for supplying heat to an externally fired power system that includes the steps of:
supplying a stream of pre-heated air and a portion of the total amount of combustion fuel to a first combustion chamber;
combusting the mixture of pre-heated air and combustion fuel to form a first flue gas stream,
the amount of combustion fuel supplied to the first combustion chamber being chosen such that the temperature of the first flue gas stream is below the temperature at which $NO_x$ gases form;
transferring heat from the first flue gas stream to a working fluid stream from an externally fired power system;
combusting the remaining combustion fuel in a series of one or more successive combustion steps to form in each step a flue gas stream using the flue gas stream created in the immediately preceding combustion step,
the amount of combustion fuel in each successive combustion step being chosen such that the temperature of the flue gas stream created by the combustion step is below the temperature at which $NO_x$ gases form,
the sum of the temperature rises associated with each combustion step being equal to the temperature rise associated with combusting all of the combustion fuel in a single combustion step using the minimum amount of air necessary for combustion; and
transferring heat from each successive flue gas stream to a working fluid stream from the externally fired power system.

In a second aspect, the invention features a method for supplying heat to an externally fired power system comprising the steps of:
supplying a stream of pre-heated air and a portion of the total amount of combustion fuel to a first combustion chamber;
combusting the mixture of pre-heated air and combustion fuel to form a first flue gas stream,
the amount of combustion fuel supplied to the first combustion chamber being chosen such that the temperature of the first flue gas stream is below the temperature at which $NO_x$ gases form;
transferring heat from the first flue gas stream to a working fluid stream from an externally fired power system;
combusting a mixture of the first flue gas stream and a second portion of the combustion fuel in a second combustion chamber to form a second flue gas stream,
the amount of the combustion fuel supplied to the second combustion chamber being chosen such that the temperature of the second flue gas stream is below the temperature at which $NO_x$ gases form;
transferring heat from the second flue gas stream to a working fluid stream from an externally fired power system;
combusting a mixture of the second flue gas stream and a third portion of the combustion fuel in a third combustion chamber to form a third flue gas stream,
the amount of combustion fuel supplied to the third combustion chamber being chosen such that the temperature of the third flue gas stream is below the temperature at which $NO_x$ gases form and
transferring heat from the third flue gas stream to a working fluid stream from an externally fired power system,
the sum of the temperature rises associated with each combustion step being equal to the temperature rise associated with combusting all of the combustion fuel in a single combustion step using the minimum amount of air necessary for combustion.

In a third aspect, the invention features apparatus for supplying heat to an externally fired power system that includes:
a pre-heater for pre-heating an incoming air stream using heat transferred from a flue gas stream;

a first combustion chamber for combusting a mixture of pre-heated air and a portion of the total amount of combustion fuel to form a first flue gas stream;

a meter for selecting the amount of combustion fuel supplied to the first combustion chamber such that the temperature of the first flue gas stream is below the temperature at which $NO_x$ gases form;

a first heat exchanger for transferring heat from the first flue gas stream to a working fluid stream from an externally fired power system;

one or more additional combustion chambers arranged in series for combusting the remaining combustion fuel in a series of one or more successive combustion steps to form in each step a flue gas stream using the flue gas stream created in the immediately preceding combustion step;

one or more meters for selecting the amount of combustion fuel in each successive combustion step such that the temperature of the flue gas stream created by the combustion step is below the temperature at which $NO_x$ gases form, the sum of the temperature rises associated with each combustion step being equal to the temperature rise associated with combusting all of the combustion fuel in a single combustion step using the minimum amount of air necessary for combustion; and one or more additional heat exchangers for transferring heat from each successive flue gas stream to a working fluid stream from the externally fired power system.

In a fourth aspect, the invention features apparatus for supplying heat to an externally fired power system that includes:

a pre-heater for pre-heating an incoming air stream using heat transferred from a flue gas stream;

a first combustion chamber for combusting a mixture of pre-heated air and a portion of the total amount of combustion fuel to form a first flue gas stream;

a first meter for selecting the amount of combustion fuel supplied to the first combustion chamber such that the temperature of the first flue gas stream is below the temperature at which $NO_x$ gases form;

a first heat exchanger for transferring heat from the first flue gas stream to a working fluid stream from an externally fired power system;

a second combustion chamber for combusting a mixture of the first flue gas stream and a second portion of the combustion fuel to form a second flue gas stream;

a second meter for selecting the amount of the combustion fuel supplied to the second combustion chamber such that the temperature of the second flue gas stream is below the temperature at which $NO_x$ gases form;

a second heat exchanger for transferring heat from the second flue gas stream to a working fluid stream from an externally fired power system;

a third combustion chamber for combusting a mixture of the second flue gas stream and a third portion of the combustion fuel to form a third flue gas stream;

a third meter for selecting the amount of combustion fuel supplied to the third combustion chamber such that the temperature of the third flue gas stream is below the temperature at which $NO_x$ gases form; and a third heat exchanger for transferring heat from the third flue gas stream to a working fluid stream from an externally fired power stream, the sum of the temperature rises associated with each combustion step being equal to the temperature rise associated with combusting all of said combustion fuel in a single combustion step using the minimum amount of air necessary for combustion.

In preferred embodiments, both the combustion method and combustion apparatus may further include a fourth combustion cycle in which a mixture of the third flue gas stream and a fourth portion of the combustion fuel is combusted in a fourth combustion chamber to form a fourth flue gas stream. The amount of combustion fuel supplied to the fourth combustion chamber is chosen such that the temperature of the fourth flue gas stream is below the temperature at which $NO_x$ gases form. Heat is then transferred from the fourth flue gas stream to a working fluid stream from an externally fired power system. The sum of the temperature rises associated with each combustion step in the four cycle system is equal to the temperature rise associated with combusting all of the combustion fuel in a single combustion step using the minimum amount of air necessary for combustion.

In other preferred embodiments, heat is further transferred from the last flue gas stream to an incoming air stream to pre-heat the air stream, after which the flue gas stream is released to the atmosphere. Sulfur gases may also be removed from the flue gas stream, e.g., by adding limestone to the combustion fuel in the last combustion steps (e.g., to the third or fourth combustion chamber) or by scrubbing the last flue gas stream (e.g., the third or fourth flue gas stream) prior to releasing the stream to the atmosphere. One or more of the combustion chambers (e.g., the third or fourth chamber) may a fluidized bed combustion chamber. In the event that any of the flue gas streams do not have a sufficient oxygen content for combustion, a portion of the pre-heated air stream may be diverted and combusted with the combustion fuel to make up this deficiency.

The temperature of each of the flue gas streams is preferably no greater than about 1700° F. (e.g., no greater than about 1600°–1700° F.) to prevent formation of $NO_x$ gases. The overall excess of air with respect to the total amount of combustion fuel consumed is preferably about 5–7%.

A significant advantage of the multi-stage combustion system of the invention is that the extent to which the flue gas cools in any one step (and thus the temperature of the released heat) can be controlled by controlling the number of combustion stages. This, in turn, allows one to match the temperature of the released heat with the thermal characteristics of the working fluid. The ability to precisely tailor the temperature of the released heat at any point in the combustion process to match the thermal characteristics of the working fluid by manipulating the number of combustion stages provides a simple yet highly effective means of improving power plant efficiency.

Because the combustion process uses pre-heated air, heat is released at high enough temperatures to provide for reheating of the power system's working fluid, leading to further improvements in efficiency. Because these temperatures can be chosen so that they would be significantly higher than the temperature to which flue gas will be cooled in the final heat exchanger, the quantity of heat produced at higher temperatures will be greater than the quantity of heat produced at lower temperatures. The use of multiple combustion stages further enables heat to be released at higher temperatures by narrowing the extent to which the flue gas cools in any one combustion stage. The net result is that the average temperature at which the whole heat is released will be increased, thereby allowing utilization of the proposed system for a power cycle with single or multiple reheats of working fluid and further improving efficiency. At the same time, the temperature of any of the flue gas streams produced in the combustion process never exceeds the level (approximately 1600°–1700° F.) at which sulfur gases can be effectively removed, e.g., by limestone addition and at which $NO_x$ gases are produced, leading to environmentally clean production of fuel.

Another advantage is that because only a portion of the combustion fuel is burned in each combustion chamber, the air quantity in any given combustion chamber remains high, while the overall excess of air with respect to the total quantity of fuel combusted is still only 5–7%. This reduces the heat losses with the stuck gases.

Because it is not necessary to provide the combustion chambers with tubes or other heat consuming surfaces, a drastically increased velocity of gas or air can pass through the combustion chambers, thereby reducing the overall size of the combustion chamber. Moreover, the heat exchangers used for heat acquisition can be prefabricated and delivered on site in easily assembled sections, sharply reducing the cost of erecting such a combustion system. An additional advantage is that the tubes of the heat exchanger are not exposed to excessively high temperatures as in pulverized coal combustion systems nor to erosion by a fluidized bed. As a result, cheaper material in lesser quantity can be used for the tubes in the heat exchangers, further contributing to the reduction in cost of the system.

A further advantage is that the proposed system is easily controlled for it is always possible to regulate the quantity of both fuel or air to any particular combustion chamber.

Other features and advantages of the invention will be apparent from the following description of the preferred embodiments thereof, and from the claims.

DESCRIPTION OF THE PREFERRED EMBODIMENTS

Figure 1:
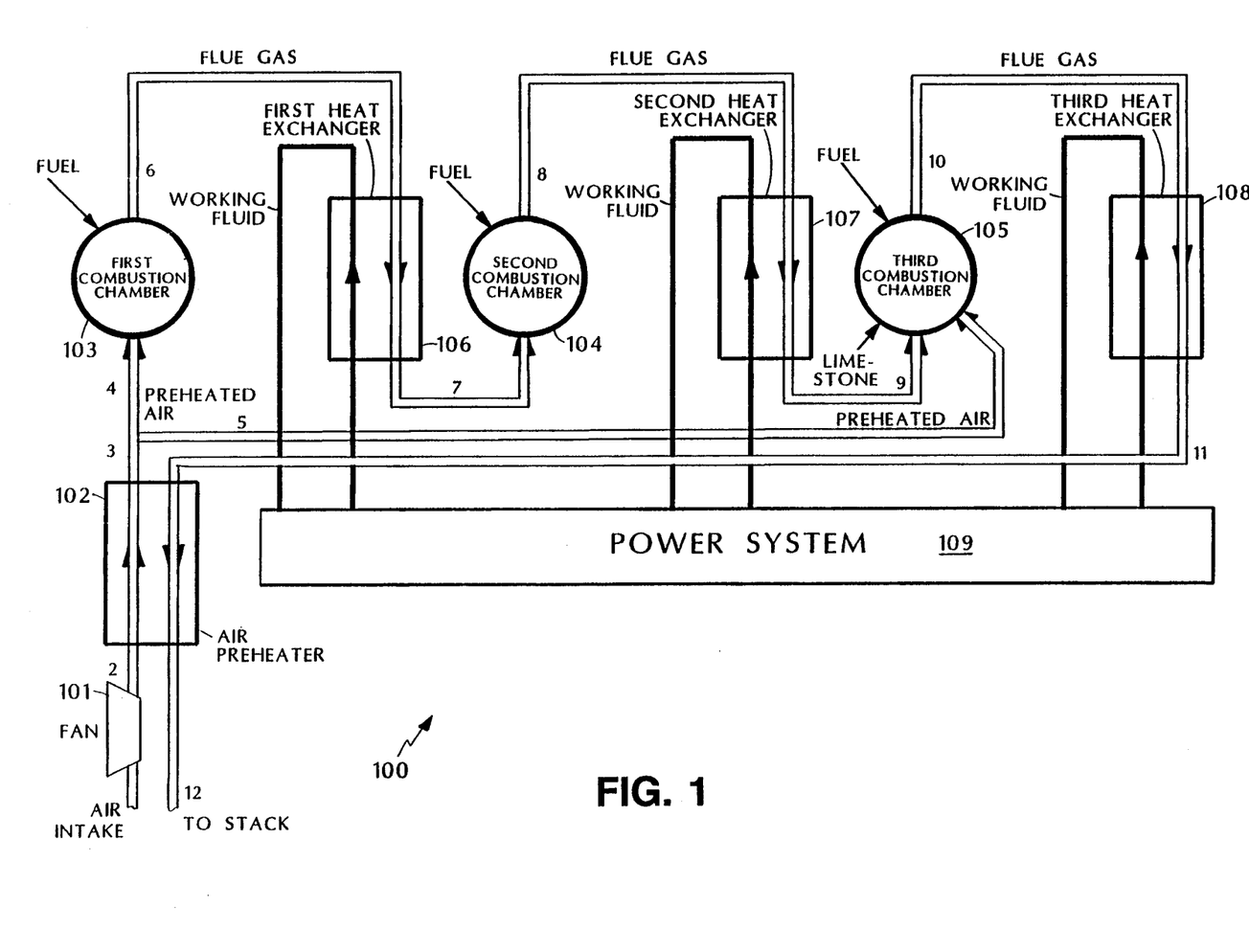
FIG. 1 is a schematic representation of an embodiment of the method and apparatus of the present invention having 3 combustion cycles.

This invention is a novel method and apparatus for combusting fuel to supply heat to externally fired power plants. The schematic shown in FIG. 1 shows an embodiment of a preferred apparatus that may be used in the method of the present invention. Specifically, FIG. 1 shows a combustion system 100 that includes fan 101, air preheater 102, combustion chambers 103, 104, and 105, heat exchangers 106, 107, and 108, and external power system 109.

The power system 109 may be any externally direct fired power conversion system. The combustion system according to the invention is particularly useful in power cycles and systems in which much of the heat needed for energy conversion cycles is used not for vaporization of working fluid, but rather for its superheating and reheating. Examples of such power systems are described, e.g., in U.S. Pat. Nos. 4,732,005 and 4,899,545, which are hereby incorporated by reference.

Referring to FIG. 1, atmospheric air with the parameters at point 1 is fed into combustion system 100 by a fan 101. After the air pressure is increased, the air stream exits the fan having the parameters at point 2. The air then passes through an air preheater 102 where it is heated to a temperature of approximately 500°–600° F. and obtains the parameters at point 3. Thereafter, the stream of air is divided into two substreams with the parameters at points 4 and 5, respectively. The substream having the parameters at point 4 (containing most of the air) is then sent into a first combustion chamber 103 where it is combusted with fuel supplied to chamber 103 in such a quantity as to provide the flue gases which leave combustion chamber 103 with a temperature not exceeding 1600°–1700° F., which is necessary to prevent $NO_x$ formation. The amount of fuel supplied to chamber 103 represents only a portion of the total fuel to be combusted.

Thereafter, flue gas having the parameters at point 6 passes through a first heat exchanger 106. The working fluid of power system 109 also passes in counter flow through heat exchanger 106, with the net result that heat is transferred from the flue gas to this working fluid. The cooled flue gas then exits from heat exchanger 106, obtaining the parameters at point 7. The temperature at point 7 is chosen to provide the necessary high temperature of heat being transferred to the working fluid. If necessary, the temperature at point 7 can be significantly higher than the temperature at point 4 such that all heat transferred to the working fluid in the first heat exchanger will have a relatively high temperature.

Because only a portion of the total fuel to be combusted has been burned in first combustion chamber 103, flue gas leaving the first combustion chamber still contains a significant quantity of oxygen and thus can be used for further combustion. Thus, after passing through heat exchanger 106, flue gas having the parameters at point 7 is directed into a second combustion chamber 104 which is again supplied by fuel in a quantity necessary to provide flue gases exiting combustion chamber 104 with a temperature not exceeding 1600°–1700° F.

Flue gas leaves the second combustion chamber 104 with parameters corresponding to point 8. Thereafter, the flue gas passes through a second heat exchanger 107 and is again cooled, thereby transferring heat to the working fluid of power system 109 and obtaining the parameters at point 9.

The temperature of the flue gas at point 9 is chosen to provide the necessary high temperature of heat released in heat exchanger 107 and transferred to the working fluid. Because in both the first and second combustion chambers only a part of the fuel to be combusted has been combusted, flue gas having the parameters at point 9 still contains enough oxygen necessary to complete combustion in a third combustion chamber 105. However, if oxygen contained in the flue gas is not sufficient to provide complete combustion in the third combustion chamber, then a stream of preheated air having the parameters at point 5 is additionally fed into third combustion chamber 105.

The balance of fuel is fed into third combustion chamber 105 to complete the combustion process (again taking care that the amount of fuel is chosen such that the temperature of the resulting flue gas does not exceed 1600°–1700° F). Limestone may also be added to combustion chamber 105 to absorb sulfur gases from the flue gas, thereby effectively controlling their emission. For this purpose, the third combustion chamber 105 may be a fluidized bed combustor.

Flue gas leaving the third combustion chamber 105, having parameters as at point 10, passes through a third heat exchanger 108, where it again transfers heat to the working fluid from power system 109 and then exits heat exchanger 108 having the parameters at point 11. The temperature at point 11 is lower than the temperature at points 7 and 9, i.e., the points of exit from first and second heat exchangers 106 and 107. Thereafter, the flue gas is sent counterflow to the ongoing air into air preheater 102 and cooled to have the parameters at point 12. It is then released to the stack.

Each individual combustion step is associated with a rise in the temperature of the incoming gas stream. The total of the temperature rises in all of the combustion chambers is equal to the total that would be achieved if the fuel were combusted in one stage using the minimum amount of air necessary for complete combustion. However, it is possible that, because of the relatively high temperature of flue gas entering the second and third combustion chambers, the quantity of fuel that can be burned in those chambers must be reduced to prevent the temperature of the flue gas leaving those combustion chambers from exceeding a temperature of 1600°–1700° F. As a result, the total of the temperature increases in all three combustion chambers may be less than the total temperature rise defined by combusting all of the fuel in one step. This, in turn, could cause flue gas leaving the third combustion chamber to retain a significant quantity of oxygen, thereby leading to an unacceptably high excess of air introduced for the overall combustion process. To avoid this problem, an addition combustion stage, i.e., a fourth combustion chamber can be utilized.

Figure 2:
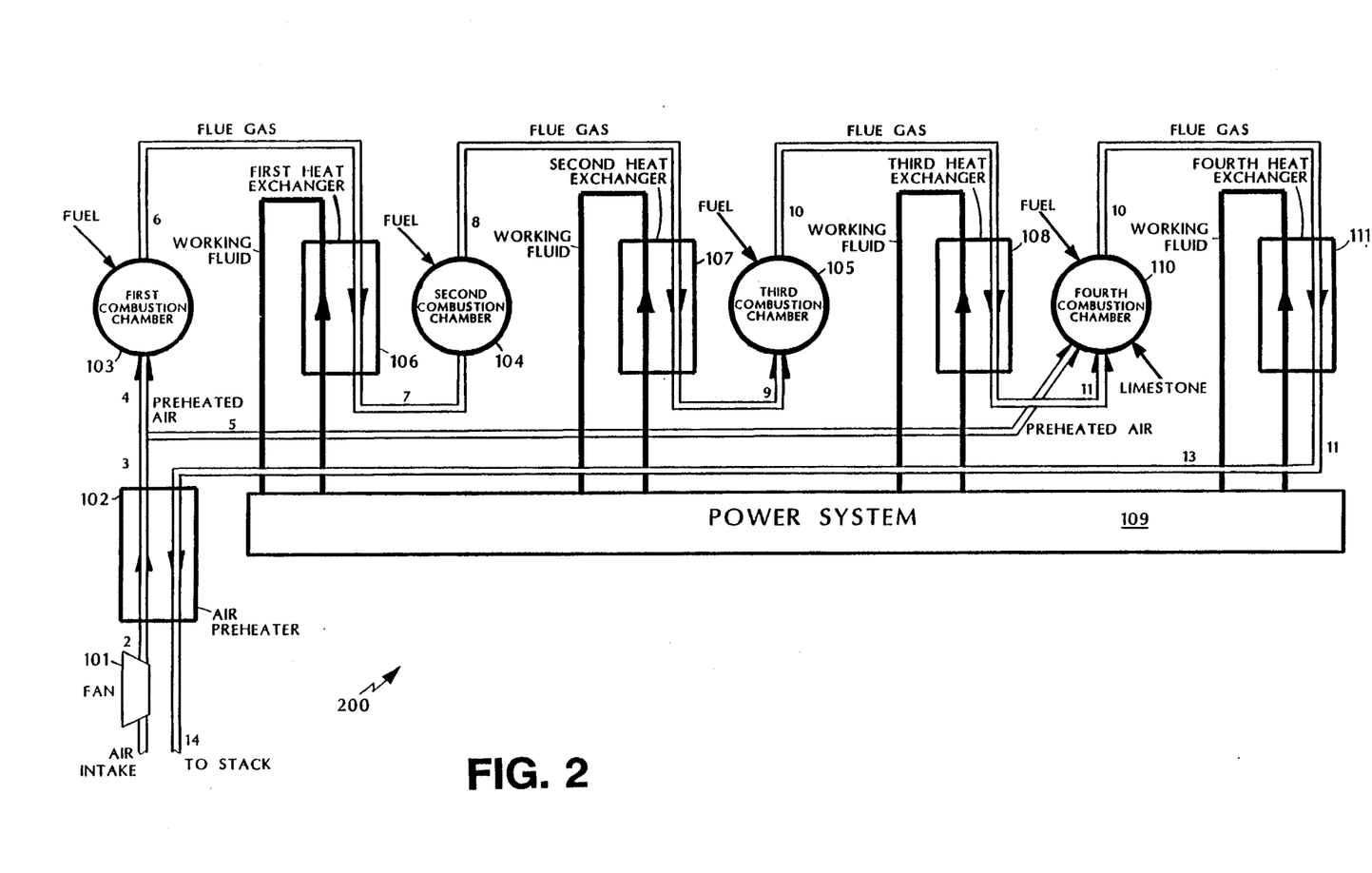
FIG. 2 is a schematic representation of an embodiment of the method and apparatus of the present invention having 4 combustion cycles.

A four-stage combustion system 200 is shown in FIG. 2. Combustion system 200 is identical to combustion system 100 (FIG. 1) except that it further includes a fourth combustion chamber 110 and a fourth heat exchanger 111. After flue gas exits the third heat exchanger 108, having parameters at point 11, it is fed into fourth combustion chamber 110, along with the remaining combustion fuel, to complete the combustion process (once again taking care that the amount of fuel is chosen such that the temperature of the resulting flue gas does not exceed 1600°–1700° F.). If the oxygen content of the flue gas is not sufficient to provide complete combustion in the fourth combustion chamber, then a stream of preheated air having the parameters at point 5 is additionally fed into fourth combustion chamber 110. Limestone may also be added to combustion chamber 110 to absorb sulfur gases from the flue gas (in which case combustion chamber 110 may be a fluidized bed combastor).

Flue gas leaving the fourth combustion chamber 110, having parameters at point 12, passes through a fourth heat exchanger 111, where it again transfers heat to the working fluid from power system 109 and then exits heat exchanger 111 having the parameters at point 13. The temperature at point 13 is lower than the temperature at points 7, 9, and 11, i.e., the points of exit from first, second, and third heat exchangers 106, 107, and 108. Thereafter, the flue gas is sent counterflow to the ongoing air into air preheater 102 and cooled to have the parameters at point 14. It is then released to the stack.

While the present invention has been described with respect to a number of preferred embodiments, those skilled in the art will appreciate a number of variations and modifications of those embodiments. It is intended that the appended claims cover all such variations and modifications as falling within the true spirit and scope of the invention.

For example, while the systems described above are presented as a three- and four-stage combustion systems, it is evident that any number of stages can be used, i.e., the apparatus can have more than three or four stages, or even as few as two. The number of stages is chosen based on the thermal characteristics of the working fluid stream in order to match the temperature of the released heat with these characteristics. In this way, the released heat can be precisely tailored to match the demands of the power plant, thereby increasing overall efficiency.

Cleaning of flue gases to remove sulfur gases can be performed prior to releasing the gases to the stack using scrubbers.

The multiple combustion chambers may be arranged vertically, i.e., with the last combustion chamber on the top and previous combustion chambers consecutively underneath. In such a case, the system may be configured such that ash from the final combustion chamber, as well as fuel which has not completely burned from the final combustion chamber, falls down successively to each previous combustion chamber. This arrangement would assure complete combustion of all fuel and at the same time allow ash removal only from the lowest combustion chamber.

What is claimed is:

1. A method for supplying heat to an externally fired power system comprising the steps of:

supplying a stream of pre-heated air and a first amount of a total amount of combustion fuel combusted in said method to a first combustion chamber, resulting in a mixture of said pre-heated air and said combustion fuel;

combusting the mixture of said pre-heated air and said combustion fuel in said first combustion chamber to form a first flue gas stream having a first flue gas temperature, said first amount of said combustion fuel supplied to said first combustion chamber being chosen such that said first flue gas temperature is below a temperature at which $NO_x$ gases form;

transferring heat from said first flue gas stream to a working fluid stream from an externally fired power system;

combusting one or more further amounts of said total amount of combustion fuel in a series of one or more successive combustion steps to form in each step a flue gas stream having a successive flue gas temperature using the flue gas stream created in the immediately preceding combustion step, each said further amount of combustion fuel in each said successive combustion step being chosen such that each said successive flue gas temperature is below the temperature at which $NO_x$ gases form, wherein a sum of the temperature rises associated with each combustion step being equal to the temperature rise associated with combusting all of said total amount of combustion fuel in a single combustion step using a minimum amount of air necessary for complete combustion;

transferring heat from each successive flue gas stream to a working fluid stream from said externally fired power system; and using the flue gas stream of one of said successive combustion steps to provide heat to an incoming air stream to generate said stream of pre-heated air.

2. The method of claim 1 wherein said series of one or more successive combustion steps includes a last step forming a last flue gas stream, and heat is transferred from the last flue gas stream to an incoming air stream to pre-heat said air stream and generate said stream of preheated air; and further comprising releasing said last flue gas stream to the atmosphere.

3. The method of claim 1 wherein said series of one or more successive combustion steps includes a last step forming a last flue gas stream containing sulfur gases, and further comprising adding limestone to the combustion fuel in the last combustion step to remove said sulfur gases.

4. The method of claim 1 wherein said series of one or more successive combustion steps includes a last step forming a last flue gas stream containing sulfur gases, and further comprising removing said sulfur gases by scrubbing the last flue gas stream.

5. The method of claim 1 further comprising diverting a portion of said stream of pre-heated air and combusting said portion of said stream of pre-heated air with said combustion fuel in one or more of said combustion steps.

6. The method of claim 1 wherein said first flue gas temperature and each said successive flue gas temperatures is no greater than about 1700° F. to prevent formation of $NO_x$ gases.

7. The method of claim 1 wherein said stream of preheated air has an overall excess of air with respect to stoichiometric combustion of the total amount of combustion fuel combusted in said method of about 5–7%.

8. A method for supplying heat to an externally fired power system comprising the steps of:

supplying a stream of pre-heated air and a first amount of a total amount of combustion fuel combusted in said method to a first combustion chamber, resulting in a mixture of said pre-heated air and said combustion fuel;

combusting the mixture of said pre-heated air and said combustion fuel in said first combustion chamber to form a first flue gas stream having a first flue gas temperature, said first amount of said combustion fuel supplied to said first combustion chamber being chosen such that said first flue gas temperature is below a temperature at which $NO_x$ gases form;

transferring heat from said first flue gas stream to a working fluid stream from an externally fired power system;

combusting a mixture of said first flue gas stream and a second amount of said total amount of combustion fuel in a second combustion chamber to form a second flue gas stream having a second flue gas temperature, said second amount of said total amount of combustion fuel supplied to said second combustion chamber being chosen such that said second flue gas temperature is below the temperature at which $NO_x$ gases form;

transferring heat from said second flue gas stream to a working fluid stream from an externally fired power system;

combusting a mixture of said second flue gas stream and a third amount of said total amount of combustion fuel in a third combustion chamber to form a third flue gas stream having a third flue gas temperature, said third amount of said total amount of combustion fuel supplied to said third combustion chamber being chosen such that said third flue gas temperature is below the temperature at which $NO_x$ gases form;

transferring heat from said third flue gas stream to a working fluid stream from an externally fired power system, wherein a sum of the temperature rises associated with each combustion step being equal to the temperature rise associated with combusting all of said total amount of combustion fuel in a single combustion step using a minimum amount of air necessary for complete combustion, and using heat from said second or third flue gas stream to provide heat to an incoming air stream to generate said stream of pre-heated air.

9. The method of claim 8 further comprising transferring heat from said third flue gas stream to an incoming air stream to pre-heat said air stream to generate said pre-heated air; and releasing said third flue gas stream to the atmosphere.

10. The method of claim 8 further comprising adding limestone to said third amount of said total amount of combustion fuel in said third combustion chamber.

11. The method of claim 8 wherein said third flue gas stream contains sulfur gases, and further comprising removing said sulfur gases by scrubbing said third flue gas stream.

12. The method of claim 8 further comprising diverting a portion of said stream of pre-heated air and combusting said portion of said stream of preheated air with said combustion fuel in one or more of said combustion steps.

13. The method of claim 8 wherein said first, second, and third flue gas temperatures are no greater than about 1700° F. to prevent formation of $NO_x$ gases.

14. The method of claim 8 wherein said stream of pre-heated air has overall excess of air with respect to stoichiometric combustion of the total amount of combustion fuel combusted in said method of about 5–7%.

15. The method of claim 8 further comprising combusting a mixture of said third flue gas stream and a fourth amount of said total amount of said combustion fuel in a fourth combustion chamber to form a fourth flue gas stream having a fourth flue gas temperature, said fourth amount of said total amount of said combustion fuel supplied to said fourth combustion chamber being chosen such that said fourth flue gas temperature is below the temperature at which $NO_x$ gases form;

transferring heat from said fourth flue gas stream to a working fluid stream from an externally fired power system, wherein the sum of the temperature rises associated with each combustion step being equal to the temperature rise associated with combusting all of said total amount of combustion fuel in a single combustion step using the minimum amount of air necessary for complete combustion.

16. The method of claim 15 further comprising transferring heat from said fourth flue gas stream to an incoming air stream to pre-heat said air stream to generate said pre-heated air; and releasing said fourth flue gas stream to the atmosphere.

17. The method of claim 15 further comprising adding limestone to said fourth amount of said total amount of said combustion fuel in said fourth combustion chamber.

18. The method of claim 15 wherein said fourth flue gas stream contains sulfur gases and further comprising removing said sulfur gases by scrubbing said fourth flue gas stream.

19. The method of claim 15 further comprising diverting a portion of said stream of pre-heated air and combusting said portion of said stream of pre-heated air with said combustion fuel in one or more of said combustion steps.

20. The method of claim 15 wherein said first, second, third, and fourth flue gas temperatures are no greater than about 1700° F. to prevent formation of $NO_x$ gases.

21. The method of claim 15 wherein said stream of pre-heated air has overall excess of air with respect to stiochiometric combustion of the total amount of combustion fuel combusted in said method of about 5–7%.

22. Apparatus for supplying heat to an externally fired power system comprising:

a pre-heater for pre-heating an incoming air stream and generating a pre-heated air stream;

a first combustion chamber for combusting a mixture of said pre-heated air stream and a first amount of a total amount of combustion fuel combusted in said apparatus to form a first flue gas stream having a first flue gas temperature;

a meter for selecting said first amount of said combustion fuel supplied to said first combustion chamber such that said first flue gas temperature is below a temperature at which $NO_x$ gases form;

a first heat exchanger for transferring heat from said first flue gas stream to a working fluid stream from an externally fired power system;

one or more additional combustion chambers arranged in series for combusting one or more further amounts of said total amount of combustion fuel in a series of one or more successive combustion steps to form in each step a flue gas stream having a successive flue gas temperature using the flue gas stream created in the immediately preceding combustion step;

one or more meters for selecting each said further amount of combustion fuel in each said successive combustion step such that each said successive flue gas temperature is below the temperature at which $NO_x$ gases form, wherein a sum of the temperature rises associated with each combustion step being equal to the temperature rise associated with combusting all of said total amount of combustion fuel in a single combustion step using the minimum amount of air necessary for complete combustion; and one or more additional heat exchangers for transferring heat from each successive flue gas stream to a working fluid stream from said externally fired power system, said pre-heater using heat transferred from one of said flue gas streams.

23. The apparatus of claim 22 wherein said one or more combustion chambers include a last combustion chamber having sulfur gases and further comprising means for adding limestone to the combustion fuel in the last combustion chamber to remove said sulfur gases.

24. The apparatus of claim 22 wherein said one or more combustion chambers include a last combustion chamber having a last flue gas stream containing sulfur gases and further comprising a scrubber for scrubbing the last flue gas stream to remove said sulfur gases.

25. The apparatus of claim 22 further comprising means for diverting a portion of said stream of pre-heated air to one or more of said combustion chambers for combustion with said combustion fuel.

26. The apparatus of claim 22 wherein each said successive flue gas temperature is no greater than about 1700° F. to prevent formation of $NO_x$ gases.

27. The apparatus of claim 22 wherein said pre-heated air stream has an overall excess of air with respect to stiochiometric combustion with the total amount of combustion fuel combusted in said combustion chambers of about 5–7%.

28. The apparatus of claim 22 wherein at least one of said combustion chambers comprises a fluidized bed combustion chamber.

29. Apparatus for supplying heat to an externally fired power system comprising:

a pre-heater for pre-heating an incoming air stream and generating a pre-heated air stream;

a first combustion chamber for combusting a mixture of said pre-heated air stream and a first amount of a total amount of combustion fuel combusted in said apparatus to form a first flue gas stream having a first flue gas stream temperature;

a first meter for selecting said first amount of combustion fuel supplied to said first combustion chamber such that said first flue gas temperature of said first flue gas stream is below the temperature at which $NO_x$ gases form;

a first heat exchanger for transferring heat from said first flue gas stream to a working fluid stream from an externally fired power system;

a second combustion chamber for combusting a mixture of said first flue gas stream and a second amount of said total amount of combustion fuel to form a second flue gas stream having a second flue gas temperature;

a second meter for selecting said second amount of combustion fuel supplied to said second combustion chamber such that said second flue gas temperature is below the temperature at which $NO_x$ gases form;

a second heat exchanger for transferring heat from said second flue gas stream to a working fluid stream from an externally fired power system;

a third combustion chamber for combusting a mixture of said second flue gas stream and a third amount of said total amount of combustion fuel to form a third flue gas stream having a third flue gas temperature;

a third meter for selecting said third amount of combustion fuel supplied to said third combustion chamber such that said third flue gas temperature is below the temperature at which $NO_x$ gases form; and a third heat exchanger for transferring heat from said third flue gas stream to a working fluid stream from an externally fired power stream, wherein a sum of the temperature rises associated with each combustion step being equal to the temperature rise associated with combusting all of said total amount of combustion fuel in a single combustion step using the minimum amount of air necessary for complete combustion, said pre-heater using heat transferred from one of said flue gas stream.

30. The apparatus of claim 29 wherein said third combustion chamber has sulfur gases therein and further comprising means for adding limestone to the combustion fuel in said third combustion chamber to remove said sulfur gases.

31. The apparatus of claim 29 wherein said third flue gas stream has sulfur gases therein and further comprising a scrubber for scrubbing said third flue gas stream to remove said sulfur gases.

32. The apparatus of claim 29 further comprising means for diverting a portion of said pre-heated air to one or more of said combustion chambers for combustion with said combustion fuel.

33. The apparatus of claim 29 wherein said first, second, and third flue gas temperatures are no greater than about 1700° F. to prevent formation of $NO_x$ gases.

34. The apparatus of claim 29 wherein said pre-heated air stream has an overall excess of air with respect to stiochiometric combustion with the total amount of combustion fuel combusted in said combustion chambers of about 5-7%.

35. The apparatus of claim 29 wherein said third combustion chamber comprises a fluidized bed combustion chamber.

36. The apparatus of claim 29 further comprising
a fourth combustion chamber for combusting a mixture of said third flue gas stream and a fourth amount of said total amount of combustion fuel to form a fourth flue gas stream having a fourth flue gas stream temperature;
a fourth meter for selecting said fourth amount of combustion fuel supplied to said fourth combustion chamber such that said fourth flue gas stream temperature is below the temperature at which $NO_x$ gases form; and
a fourth heat exchanger for transferring heat from said fourth flue gas stream to a working fluid stream from an externally fired power stream,
wherein the sum of the temperature rises associated with each combustion step being equal to the temperature rise associated with combusting all of said total amount of combustion fuel in a single combustion step using the minimum amount of air necessary for complete combustion.

37. The apparatus of claim 36 wherein said fourth combustion chamber has sulfur gases therein and further comprising means for adding limestone to said fourth amount of said total amount of combustion fuel in said fourth combustion chamber to remove said sulfur gases.

38. The apparatus of claim 36 wherein said fourth flue gas stream contains sulfur gases therein and further comprising a scrubber for scrubbing said fourth flue gas stream to remove said sulfur gases.

39. The apparatus of claim 36 further comprising means for diverting a portion of said pre-heated air stream to one or more of said combustion chambers for combustion with said combustion fuel.

40. The apparatus of claim 36 wherein said first, second, third, and fourth flue gas temperatures are no greater than about 1700° F. to prevent formation of $NO_x$ gases.

41. The apparatus of claim 36 wherein said pre-heated air stream has an overall excess of air with respect to stiochiometric combustion of the total amount of combustion fuel combusted in said combustion chambers of about 5-7%.

42. The apparatus of claim 36 wherein said fourth combustion chamber comprises a fluidized bed combustion chamber.

* * * * *

UNITED STATES PATENT AND TRADEMARK OFFICE
CERTIFICATE OF CORRECTION

PATENT NO.    : 5,450,821

DATED         : September 19, 1995

INVENTOR(S)   : Alexander I. Kalina

It is certified that error appears in the above-identified patent and that said Letters Patent is hereby corrected as shown below:

Col. 13, claim 32, line 19, insert --stream-- after "air".

Signed and Sealed this

Twenty-third Day of July, 1996

Attest:

BRUCE LEHMAN

Attesting Officer

Commissioner of Patents and Trademarks